(12) United States Patent  
Elia et al.

(10) Patent No.: US 8,298,403 B2  
(45) Date of Patent: Oct. 30, 2012

(54) DEWAXING CATALYSTS AND PROCESSES

(75) Inventors: Christine N. Elia, Bridgewater, NJ (US); Wenyih F. Lai, Bridgewater, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 423 days.

(21) Appl. No.: 12/653,037

(22) Filed: Dec. 8, 2009

(65) Prior Publication Data

US 2010/0147747 A1  Jun. 17, 2010

Related U.S. Application Data

(60) Provisional application No. 61/201,851, filed on Dec. 16, 2008.

(51) Int. Cl.
*C10G 73/38* (2006.01)
*B01J 29/068* (2006.01)
*B01J 29/80* (2006.01)

(52) U.S. Cl. .............. 208/149; 208/27; 208/28; 502/66; 502/67

(58) Field of Classification Search .................... 208/27, 208/28, 149; 502/66, 67
See application file for complete search history.

(56) References Cited

U.S. PATENT DOCUMENTS

| RE28,398 | E | 4/1975 | Chen et al. |
|---|---|---|---|
| 4,222,855 | A | 9/1980 | Pelrine et al. |
| 4,599,162 | A | 7/1986 | Yen |
| 4,657,750 | A | 4/1987 | Takatsu et al. |
| 5,053,373 | A | 10/1991 | Zones et al. |
| 5,075,269 | A | 12/1991 | Degnan et al. |
| 5,397,454 | A | 3/1995 | Zones et al. |
| 6,051,129 | A * | 4/2000 | Harris et al. ............ 208/138 |
| 2007/0029229 | A1 | 2/2007 | Maesen et al. |
| 2007/0029230 | A1 | 2/2007 | Maesen et al. |
| 2007/0131581 | A1 | 6/2007 | Lai et al. |

OTHER PUBLICATIONS

U.S. Appl. No. 61/201,916, filed Dec. 16, 2008, Commonly owned co-pending patent application.
Parker et al., "Synthesis and Some Properties of Two Novel Zeolites, KZ-1 and KZ-2", Zeolites, vol. 3, pp. 8-11 (1983).

* cited by examiner

*Primary Examiner* — Randy Boyer
(74) *Attorney, Agent, or Firm* — Robert A. Migliorini

(57) ABSTRACT

A process for dewaxing a waxy component-containing hydrocarbon feedstock comprises contacting the feedstock under dewaxing conditions with a catalyst system comprising ZSM-48 and a molecular sieve of the MTT framework type.

26 Claims, 4 Drawing Sheets

DEWAXING CATALYSTS AND PROCESSES

CROSS-REFERENCE TO RELATED APPLICATIONS

This application claims priority to U.S. Provisional Application Ser. No. 61/201,851 filed Dec. 16, 2008, herein incorporated by reference in its entirety.

FIELD

This invention relates to catalysts and processes for the dewaxing of hydrocarbon feedstocks and particularly, but not exclusively, lubricating oil basestocks.

BACKGROUND

Dewaxing is a process for treating petroleum fractions so as to remove certain hydrocarbons, particularly straight chain and slightly branched chain paraffins, that solidify readily (waxes). Dewaxing can be effected by solvent extraction and crystallization but in recent years attention has focused on processes that remove waxes by selective catalytic conversion of the straight and slightly branched chain paraffins. An example of such a process is disclosed in U.S. Reissue Pat. No. 28,398, in which the dewaxing catalyst is the molecular sieve ZSM-5.

In the case of lubricating oil basestocks, catalytic dewaxing is often accompanied by a decrease in viscosity index (VI) which is undesirable since VI is a measure of the ability of the oil to retain its viscosity with increasing temperature. Catalytic dewaxing generally functions via two mechanisms, isomerization and cracking, and the loss in VI is typically associated with the cracking mechanism. There is therefore interest in developing dewaxing catalyst systems that show high selectivity towards isomerization and low selectivity towards cracking.

For example, U.S. Pat. No. 4,222,855 discloses that low pour point lubricating oils with a high VI can be produced from waxy hydrocarbon fractions boiling within the approximate range of 450 to 1050° F. (232 to 566° C.) by contacting the waxy fractions with a catalyst comprising an aluminosilicate zeolite selected from ZSM-23 and ZSM-35 and a hydrogenation metal. The resultant dewaxed oil is said to have a V.I. considerably higher than that obtained with a ZSM-5 catalyst.

In addition, U.S. Pat. No. 5,075,269 discloses that waxy hydrocarbon oils can be catalytically dewaxed to produce high viscosity index lubricating oil stocks utilizing as a catalyst the acidic zeolite ZSM-48 and in particular ZSM-48 synthesized using a organic linear diquaternary ammonium compound as the structure directing agent. Again, the dewaxed oil is said to have a higher V.I. than that obtained with ZSM-5.

A high aluminum form of ZSM-48, having a silica:alumina molar ratio of 110 or less and being free of non-ZSM-48 seed crystals and free of ZSM-50, is disclosed in U.S. Published Patent Application No. 2007/0131581 and is shown to exhibit enhanced activity as a dewaxing catalyst as compared with conventional forms of ZSM-48, such as that employed in U.S. Pat. No. 5,075,269.

It is also known to effect dewaxing of hydrocarbon feedstocks using a pluarlity of different zeolitic materials, arranged sequentially or combined in a single catalyst bed, in an attempt to improve the properties of the final dewaxed product.

For example, U.S. Pat. No. 4,599,162 discloses a cascade catalytic dewaxing process comprising a) passing a hydrocarbon feedstock containing long chain normal paraffins and long chain slightly branched paraffins, over a first crystalline silicate zeolite selected from ZSM-5, ZSM-11, ZSM-12, ZSM-22, ZSM-23, ZSM-35, ZSM-38, ZSM-48, and/or TMA Offretite, preferably ZSM-12, the first zeolite having catalytically effective amounts of a hydrogenation/dehydrogenation component in the presence of hydrogen at a temperature between 450 and 700° F. (232 and 371° C.), a pressure of about 400 psig, a hydrogen feed rate of about 2500 SCF $H_2$/bbl, and a LHSV between 0.2 and 6.0; and (b) passing the entire effluent from step (a) over a second crystalline silicate zeolite being different from the first zeolite and selected from ZSM-5, ZSM-11, ZSM-12, ZSM-23, ZSM-35, ZSM-38, ZSM-48, TMA Offretite, Clinoptilolite, and/or Erionite, preferably ZSM-5, the second zeolite having catalytically effective amounts of a hydrogenation/dehydrogenation component in the presence of hydrogen at a temperature between 500 and 700° F. (260 and 371° C.), a pressure of about 400 psig, a hydrogen feed rate of about 2500 SFC $H_2$/bbl, and a LHSV between 0.2 and 2.0. The cascade relationship of the different medium pore zeolites is said to offer superior dewaxing activities and lube yield, higher V.I., improved catalyst stability in the second stage and flexibility in catalyst regeneration as compared with prior art dewaxing catalyst systems.

In U.S. Pat. No. 6,051,129 there is a disclosed a process for reducing the haze point of a hydrocarbon oil feedstock, which has a major portion boiling over 1000° F. (538° C.), in which the feedstock is contacted with a catalyst system comprising Zeolite EU-1 and a catalyst selected from the group consisting of SSZ-32, ZSM-48, and mixtures thereof.

Moreover, U.S. Published Patent Application No. 2007/0029229 discloses a dewaxing process comprising contacting a hydrocarbon feedstock under dewaxing conditions with a catalyst comprising a combination of zeolites having the MTT framework type, such as ZSM-23, and the GON framework type, a 12 ring/8 ring zeolite with uni-dimensional channels, such as GUS-1. When used to dewax a hydrocarbon oil feedstock having a major portion boiling over 1000° F. (538° C.), the specific zeolite combination is said to significantly increase the conversion of heavy wax (long n-alkanes), thereby lowering the cloud point of the product.

U.S. Published Patent Application No. 2007/0029230 discloses a dewaxing process comprising contacting a hydrocarbon feedstock under dewaxing conditions with a catalyst comprising a combination of zeolites having the MTT framework type, such as ZSM-23, and the MTW framework type, such as ZSM-12, the MTT and MTW zeolites having a crystal size less than 0.1 micron. When used to dewax a hydrocarbonaceous feed, the MTT/MTW zeolite combination is said to improve the viscosity index of the dewaxed product as compared to that of the waxy feed.

Despite these advances there remains a need for improved dewaxing catalyst systems and processes, particularly which exhibit a combination of high activity and selectivity for the isomerization of n-paraffins in lubricating oil basestocks so as to produce high VI lubes in high yield.

In accordance with the present invention, it has now been found that a dewaxing catalyst system and process that employs a combination of ZSM-48 and an MTT framework type material, such as ZSM-23, exhibits such a desirable combination of isomerization activity and selectivity, particularly when both molecular sieves are in high aluminum forms.

SUMMARY

In one aspect, the invention resides in a process for dewaxing a waxy component-containing hydrocarbon feedstock, the process comprising contacting the feedstock under dewaxing conditions with a catalyst system comprising ZSM-48 and a molecular sieve of the MTT framework type.

Conveniently, the ZSM-48 has a silica to alumina molar ratio less than 250, such as less than 150, for example less than 100.

Conveniently, the MTT framework type molecular sieve has a silica to alumina molar ratio less than 45, such as less than 30, for example from 25 to less than 30.

Conveniently, the catalyst system further comprises a hydrogenation component, such as platinum, palladium, or mixtures thereof.

In one embodiment, the catalyst system comprises particles each containing ZSM-48 and said molecular sieve of the MTT framework type. In another embodiment, the catalyst system comprises a mixture of particles containing ZSM-48 and particles containing an MTT framework type molecular sieve.

In another embodiment, the catalyst system comprises at least two catalyst beds, at least one bed containing ZSM-48 and at least a further bed containing said molecular sieve of the MTT framework type.

Conveniently, the feedstock is a waxy component-containing lube range material, such as a waxy component-containing hydrocarbon oil boiling above about 350° F. (177° C.).

In a further aspect, the invention resides in a dewaxing catalyst comprising particles each containing ZSM-48 and a molecular sieve of the MTT framework type.

Conveniently, the particles further comprise a binder such as alumina, silica, titania, or zirconia or mixture of those metal oxides and typically comprise a hydrogenation component, such as platinum, palladium, or mixtures thereof.

DETAILED DESCRIPTION OF THE EMBODIMENTS

Figure 1A:
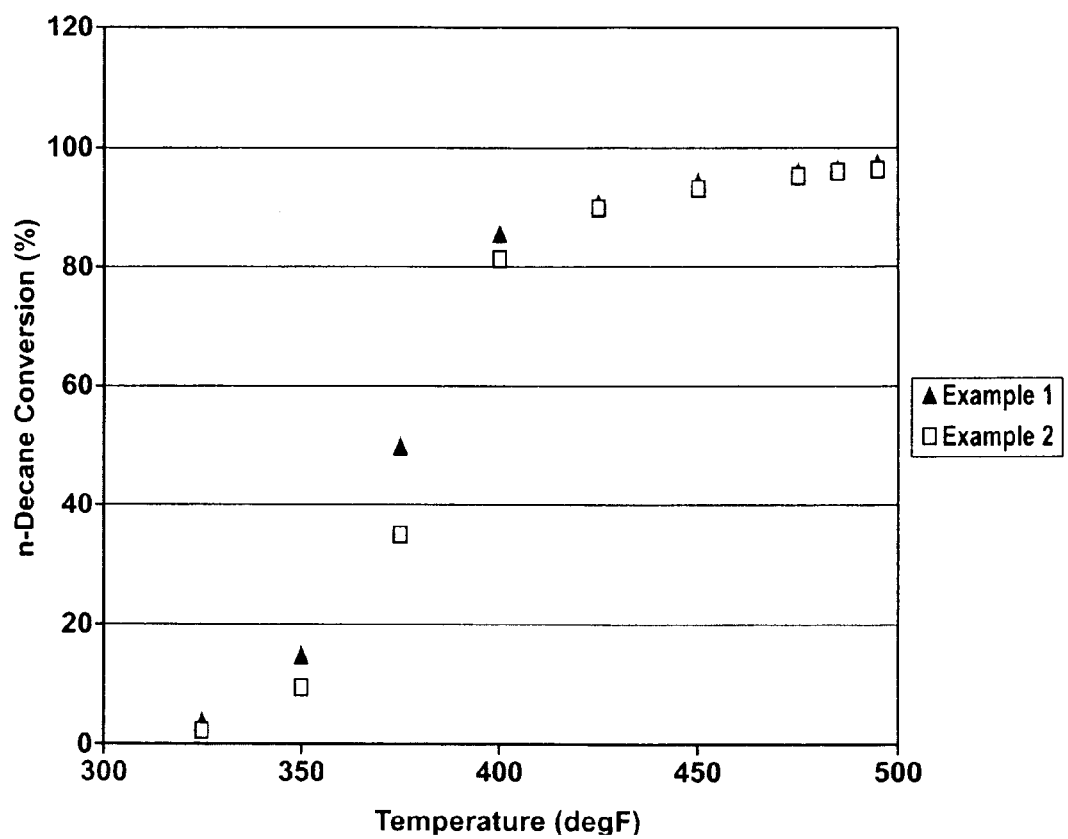
FIG. 1(a) is a graph plotting n-decane conversion against temperature for the catalysts of Examples 1 and 2.

Described herein is a dewaxing catalyst system and a dewaxing process that employ a combination of ZSM-48 and an MTT framework type molecular sieves, such as ZSM-23, typically in the presence of a hydrogenation component, such as platinum, palladium, or mixtures thereof.

ZSM-48 is a crystalline molecular sieve having pores defined by ten-ring, non-interpenetrating linear channels with ideal cross-sectional dimensions of about 5.3 Angstrom by about 5.6 Angstrom. ZSM-48 is defined by an X-ray diffraction pattern with characteristic lines as set out in Table 1 below:

TABLE 1

| Interplanar d-Spacing (Å) | Relative Intensity (I/Io) |
|---|---|
| 11.8 ± 0.2 | s |
| 10.2 ± 0.2 | w-m |

TABLE 1-continued

| Interplanar d-Spacing (Å) | Relative Intensity (I/Io) |
|---|---|
| 4.2 ± 0.05 | vs |
| 3.9 ± 0.08 | vs |
| 3.6 ± 0.06 | w |
| 3.1 ± 0.05 | w |
| 2.85 ± 0.05 | w |

The X-ray diffraction data referred to herein were collected with a Scintag theta-theta powder diffraction system, equipped with a graphite diffracted beam monochromator and scintillation counter, using copper K-alpha radiation. The diffraction data were recorded by step-scanning at 0.05 degrees of two-theta, where theta is the Bragg angle, and a counting time of 1 second for each step. The interplanar spacings, d' s, were calculated in Angstron units (Å), and the relative intensities of the lines, Ino, where Io is one-hundredth of the intensity of the strongest line, above background, were derived with the use of a profile fitting routine (or second derivative algorithm). The intensities are uncorrected for Lorentz and polarization effects. The relative intensities are given in terms of the symbols vs=very strong (75-100), s=strong (50-74), m=medium (25-49) and w=weak (0-24). It should be understood that diffraction data listed for this sample as single lines may consist of multiple overlapping lines which under certain conditions, such as differences in crystallite sizes or very high experimental resolution or crystallographic change, may appear as resolved or partially resolved lines. Typically, crystallographic changes can include minor changes in unit cell parameters and/or a change in crystal symmetry, without a change in topology of the structure. These minor effects, including changes in relative intensities, can also occur as a result of differences in cation content, framework composition, nature and degree of pore filling, and thermal and/or hydrothermal history.

ZSM-48 is described in U.S. Pat. No. 4,375,573, the entire disclosure of which is incorporated herein by reference and which describes ZSM-48 as having the following formula:

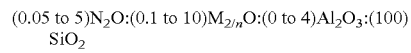

(0.05 to 5)$N_2O$:(0.1 to 10)$M_{2/n}O$:(0 to 4)$Al_2O_3$:(100) $SiO_2$ wherein M is at least one cation having a valence n, N is a mixture of a $C_2$ to $C_{12}$ alkylamine and a tetramethyl ammonium compound used to direct the synthesis of the desired zeolite structure.

Conveniently, the ZSM-48 used in the present dewaxing catalyst and process has a silica to alumina molar ratio less than 250, such as less than 150, for example less than 100. One method of producing such a material is disclosed in U.S. Published Patent Application No. 2007/0131581, in which the structure directing agent is a hexamethonium compound and the resultant ZSM-48 is substantially free of ZSM-50 and has a silica to alumina molar ratio from 70 to 110, such as from 80 to 100, for example from 85 to 95. The entire disclosure of U.S. Published Patent Application No. 2007/0131581 is incorporated herein by reference.

MTT framework type molecular sieves are porous crystalline materials having pores defined by parallel channels with cross-sectional dimensions of about 4.5 Angstrom by about 5.2 Angstrom. ZSM-23 was the first molecular sieve isolated with an MTT framework type and is disclosed in U.S. Pat. No. 4,076,842, the entire disclosure of which is incorporated herein by reference. ZSM-23 has an X-ray diffraction pattern with characteristic lines as set out in Table 2 below:

TABLE 2

| Interplanar d-Spacing (Å) | Relative Intensity (I/Io) |
|---|---|
| 11.2 ± 0.33 | m |
| 10.1 ± 0.20 | w |
| 7.87 ± 0.15 | w |
| 5.59 ± 0.10 | w |
| 5.44 ± 0.10 | w |
| 4.90 ± 0.10 | w |
| 4.53 ± 0.10 | s |
| 3.90 ± 0.08 | vs |
| 3.72 ± 0.08 | vs |
| 3.62 ± 0.07 | vs |
| 3.54 ± 0.07 | m |
| 3.44 ± 0.07 | s |
| 3.36 ± 0.07 | w |
| 3.16 ± 0.07 | w |
| 3.05 ± 0.06 | w |
| 2.99 ± 0.06 | w |
| 2.85 ± 0.06 | w |
| 2.54 ± 0.05 | m |
| 2.47 ± 0.05 | w |
| 2.40 ± 0.05 | w |
| 2.34 ± 0.05 | w |

Examples of other MTT framework type molecular sieves that can be used herein include SSZ-32 (see U.S. Pat. No. 5,053,373), EU-13 (see U.S. Pat. No. 4,705,674), ISI-4 (see U.S. Pat. No. 4,657,750) and KZ-1 (see Parker et al., "Synthesis and Some Properties of Two Novel Zeolites, KZ-1 and KZ-2" Zeolites vol. 3, pp. 8-11, 1983).

Generally, the MTT framework type molecular sieve employed in the present process and catalyst is a high activity ZSM-23 material having a silica to alumina molar ratio less than 45, such as less than 30, for example from 25 to less than 30. Such a material is disclosed in U.S. Patent Application Ser. No. 61/201,916 filed Dec. 16, 2008 and is produced by crystallizing a mixture comprising sources of an alkali or alkaline earth metal (M), an oxide of trivalent element (X), an oxide of tetravalent element (Y), water and a directing Agent® of the formula $(CH_3)_3N^+CH_2CH_2CH_2N^+(CH_3)_2CH_2CH_2CH_2N^+(CH_3)_3$ (Triquat-7), wherein the mixture has the following composition, in terms of mole ratios:

| Component | Useful | Preferred |
|---|---|---|
| $YO_2/X_2O_3$ | less than 45 | less than 35 |
| $H_2O/YO_2$ | 5-100 | 10-50 |
| $OH^-/YO_2$ | 0.05 to 0.5 | 0.1-<0.5 |
| $R/YO_2$ | >0 to <0.5 | 0.01-<0.3 |
| $M/YO_2$ | 0.05 to 0.5 | 0.1-0.4 |

Generally, the $YO_2/X_2O_3$ molar ratio of the reaction mixture is less than 30, and typically from 25 to less than 30. Generally, the $OH^-/YO_2$ molar ratio of the mixture is from 0.2 to less than 0.4 and $R/YO_2$ molar ratio is from 0.01 to less than 0.1.

In one embodiment, the reaction mixture also contain seeds, typically of an MTT framework type molecular sieve, in sufficient amount to enhance synthesis of the desired ZSM-23 material, such as at least 500 ppm, for example at least 1,000 ppm, such as at least 10,000 ppm of the overall reaction mixture.

Crystallization is carried out under either stirred or static conditions, preferably stirred conditions, at a temperature from about 150° C. to about 200° C., such as from about 160° C. to about 180° C. Generably, crystallization is conducted for from about 24 to about 300 hours, such as from about 72 to about 200 hours, whereafter the resultant ZSM-23 product is separated from the mother liquor and recovered. Generally, the ZSM-23 product is in the form of aggregates of small crystals having an average crystal size of about 0.02 to about 0.5 microns and an external surface area of less than 80 m²/g.

The resultant ZSM-23 contains the Triquat-7 used as the directing agent and, prior to use as a dewaxing catalyst, the as-synthesized material is normally treated to remove part or all of this organic constituent. This is conveniently effected by heating the as-synthesized material at a temperature of from about 250° C. to about 550° C. for from 1 hour to about 48 hours.

One, or more preferably both, of the molecular sieves employed in the present dewaxing catalyst and process are normally associated with a hydrogenation component, such as tungsten, vanadium, molybdenum, rhenium, nickel, cobalt, chromium, manganese, or a noble metal such as platinum or palladium. Preferred hydrogenation components include platinum, palladium and mixtures thereof. Such components can be exchanged into the composition, impregnated therein or physically intimately admixed therewith. For example, in the case of platinum, such components can be impregnated in or on the or each molecular sieve by treating the material with a platinum metal-containing ion. Suitable platinum compounds for this purpose include chloroplatinic acid, platinous chloride and various compounds containing the platinum amine complex. Combinations of metals and methods for their introduction can also be used.

One, or more preferably both, of the molecular sieves employed in the present dewaxing catalyst and process may also be combined with another material resistant to the temperatures and other conditions employed in the dewaxing process. Such matrix materials include active and inactive materials and synthetic or naturally occurring zeolites as well as inorganic materials such as clays, silica and/or metal oxides, e.g. alumina, titania and/or zirconia. The latter may be either naturally occurring or in the form of gelatinous precipitates, sols or gels including mixtures of silica and metal oxides. Use of a material in conjunction with the or each molecular sieve, i.e. combined therewith, which is active, may enhance the conversion and/or selectivity of the catalyst in certain organic conversion processes. Inactive materials suitably serve as diluents to control the amount of conversion in the process so that products can be obtained economically and orderly without employing other means for controlling the rate or reaction. Frequently, crystalline catalytic materials have been incorporated into naturally occurring clays, e.g. bentonite and kaolin. These materials, i.e. clays, oxides, etc., function, in part, as binders for the catalyst. It is desirable to provide a catalyst having good crush strength because in practice the catalyst is often subjected to rough handling, which tends to break the catalyst down into powder-like materials which cause problems in processing.

Naturally occurring clays which can be composited with the or each molecular sieve employed herein include the montmorillonite and kaolin families which include the sub-bentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the present molecular sieves can be composited with a porous matrix material such as silica-alumina, silica-magnesia, silica-zirconia, silica-thoria, silica-beryllia, silica-titania, as well as ternary compositions such as silica-alumina-thoria, silica-aluminazirconia, silica-alumina-magnesia and silica-magnesia-zirconia. The matrix can be in the form of a cogel. A mixture of these components can also be used.

The relative proportions of molecular sieve and matrix may vary widely with the sieve content ranging from about 1 to about 90 percent by weight, and more usually in the range of about 2 to about 80 percent by weight of the composite. In various embodiments, the sieve content of the catalyst can be about 90 percent by weight or less, or about 85 percent or less, or about 80 percent or less, or about 70 percent or less. The sieve content can be at least about 1 percent by weight, or at least about 2 percent, or at least about 5 percent, or at least about 15 percent, or at least about 20 percent, or at least about 25 percent.

The relative proportions of the ZSM-48 molecular sieve and the MTT framework molecular sieve can also vary. The ratio of ZSM-48 to MTT framework molecular sieve can be at least about 25:75, or at least about 50:50, or at least about 65:35, or at least about 75:25, or at least about 85:15, or at least about 90:10. The ratio of ZSM-48 to MTT can also be about 98:2 or less, or about 95:5 or less, or about 90:10 or less, or about 85:15 or less, or about 75:25 or less. By combining ZSM-48 and an MTT framework molecular sieve, such as ZSM-23, in a catalyst system according to the invention, an improved combination of selectivity and reactivity can be achieved. Preferred combinations of ZSM-48 and MTT molecular sieve involve having at least about a 75:25 ratio, to maintain the high selectivity of ZSM-48 while achieving improved activity.

In the present catalyst system, the ZSM-48 and the MTT framework type molecular sieve can be coextruded, normally with a binder or matrix material, into catalyst particles each containing both molecular sieves. Alternatively, the different molecular sieves can be in separate particles, with a bed or beds of catalysts composed of mixtures of the particles. In still another embodiment, the ZSM-48 and MTT framework type molecular sieve particles can be incorporated into a stacked bed system. In such an embodiment, at least one bed includes particles containing ZSM-48 molecular sieve. At least one additional bed includes particles containing an MTT framework type molecular sieve.

The feedstocks that can be dewaxed using the present catalyst range from relatively light distillate fractions such as kerosene and jet fuel up to high boiling stocks such as whole crude petroleum, reduced crudes, vacuum tower residua, cycle oils, synthetic crudes (e.g., shale oils, tars and oil, etc.), gas oils, vacuum gas oils, foots oils, Fischer-Tropsch derived waxes, and other heavy oils. Straight chain n-paraffins either alone or with only slightly branched chain paraffins having 16 or more carbon atoms are sometimes referred to as waxes. The feedstock will often be a $C_{10}$+ feedstock generally boiling above about 350° F. (177° C.), since lighter oils will usually be free of significant quantities of waxy components. However, the catalyst is particularly useful with waxy distillate stocks such as middle distillate stocks including gas oils, kerosenes, and jet fuels, lubricating oil stocks, heating oils and other distillate fractions whose pour point and viscosity need to be maintained within certain specification limits. Lubricating oil stocks will generally boil above 230° C. (450° F.), more usually above 315° C. (600° F.). Hydroprocessed stocks are a convenient source of stocks of this kind and also of other distillate fractions since they normally contain significant amounts of waxy n-paraffins. The feedstock will normally be a $C_{10}$+ feedstock containing paraffins, olefins, naphthenes, aromatic and heterocyclic compounds and with a substantial proportion of higher molecular weight n-paraffins and slightly branched paraffins which contribute to the waxy nature of the feedstock. During the processing, the n-paraffins are isomerized to branched paraffins but also undergo some cracking or hydrocracking to form liquid range materials which contribute to a low viscosity product. The degree of cracking which occurs is, however, limited so that the yield of products having boiling points below that of the feedstock is reduced, thereby preserving the economic value of the feedstock The conditions under which the isomerization/dewaxing process is carried out generally include a temperature which falls within a range from about 392° F. to about 800° F. (200° C. to 427° C.), and a pressure from about 15 to about 3000 psig (204 to 20771 kPa). More preferably the pressure is from about 100 to about 2500 psig (790 to 17339 kPa). The liquid hourly space velocity during contacting is generally from about 0.1 to about 20, more preferably from about 0.1 to about 5. The contacting is preferably carried out in the presence of hydrogen. The hydrogen to hydrocarbon ratio preferably falls within a range from about 2000 to about 10,000 standard cubic feet H, per barrel hydrocarbon, more preferably from about 2500 to about 5000 standard cubic feet $H_2$ per barrel hydrocarbon.

The invention will now be more particularly described with reference to the Examples and the accompanying drawings.

EXAMPLE 1

0.6% Pt/Steamed50/15/35 ZSM-48/ZSM-23/$Al_2O_3$

A mixture comprising 50 wt % ZSM-48 (having a silica to alumina molar ratio of ~90/1), 15 wt % ZSM-23 (having a silica to alumina molar ratio of ~40/1), and 35 wt % alumina was extruded. The extrudate was calcined in nitrogen for 3 hours at 1000° F. (538° C.), ammonium exchanged with 1N ammonium nitrate solution, and calcined in air for 6 hours at 1000° F. (538° C.). The extrudate was steamed in full steam for 3 hours at 890° F. (477° C.). The extrudate was then impregnated via incipient wetness to 0.6 wt % Pt with tetraamminplatinumnitrate followed by calcination in air for 3 hours at 680° F. (405° C.).

EXAMPLE 2

(Comparative). 0.6% Pt/Steamed65/35 ZSM-48/$Al_2O_3$

A mixture comprising 65 wt % ZSM-48 (having a silica to alumina molar ratio of ~90/1) and 35 wt % alumina was extruded. The extrudate was calcined in nitrogen for 3 hours at 1000° F. (538° C.), ammonium exchanged with 1N ammonium nitrate solution, and calcined in air for 6 hours at 1000° F. (538° C.). The extrudate was steamed in full steam for 3 hours at 890° F. (477° C.). The extrudate was then impregnated via incipient wetness to 0.6 wt % Pt with tetraamminplatinumnitrate followed by calcination in air for 3 hours at 680° F. (405° C.).

EXAMPLE 3

Decane Isomerization with Catalysts of Examples 1 and 2

Figure 1B:
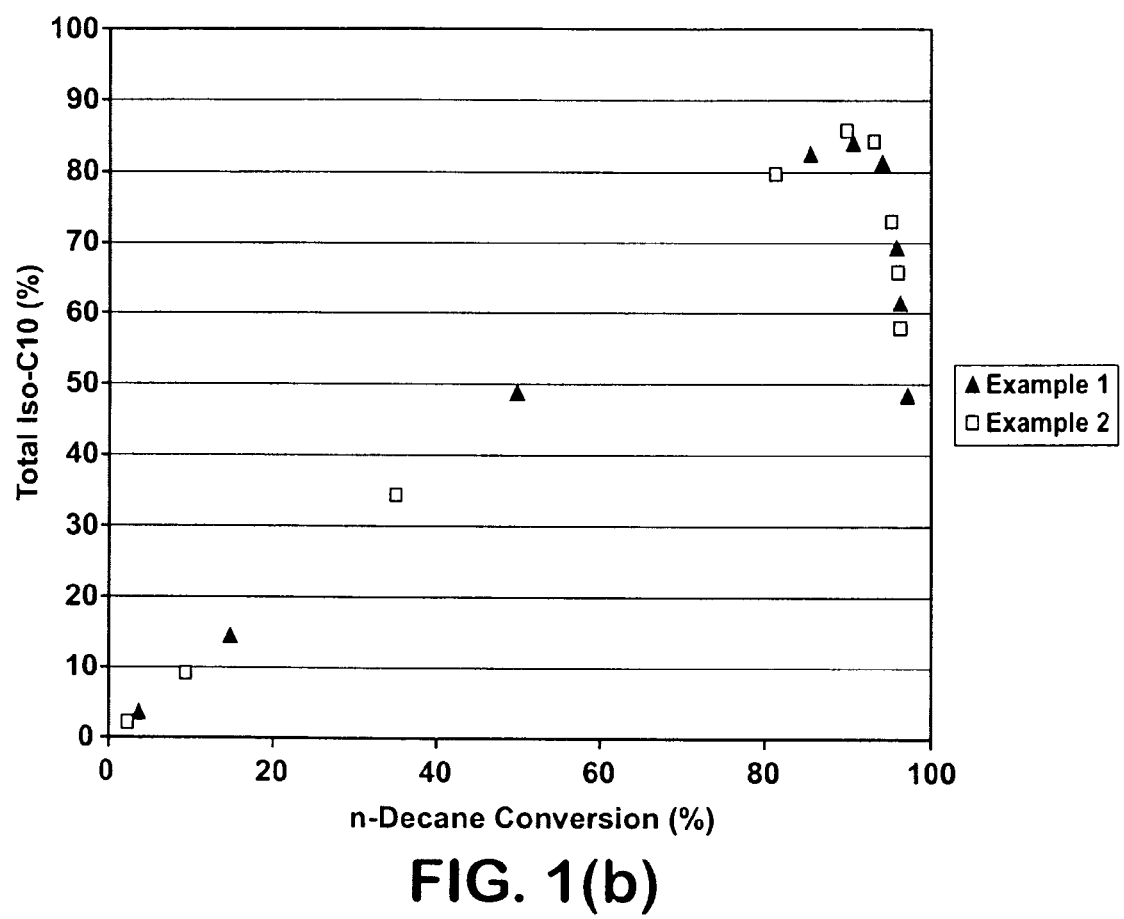
FIG. 1(b) is a graph plotting total iso-$C_{10}$ production against n-decane conversion for the catalysts of Examples 1 and 2.

The test is performed at atmospheric pressure, and the reactor vessel is quartz. Catalysts are crushed and sized to 14/25 mesh, and 1 g of sized catalyst is used for this test. The sample is first heated under nitrogen to 500° F. (260° C.), followed by reduction in hydrogen for 3 hours at atmospheric pressure. The temperature is then reduced to 325° F. (163° C.), and the flow of feed is started. The feed consists of 200 cc/min hydrogen and 0.548 cc/hr liquid n-decane, delivered by a MFC and ISCO pump, respectively. After lining the catalyst out at this temperature, the product from the reactor is analyzed by an on-line GC, and the next setpoint temperature is attained. Each catalyst is evaluated at a total of 9 different temperatures from 325° F. (163° C.) to 495° F. (257° C.). FIGS. 1(a) and 1(b) show the decane isomerization performance of catalysts from Examples 1 and 2. FIG. 1(a) shows the isomerization activity of the materials and FIG. 1(b) shows the isomerization selectivity of the materials.

It will be seen from FIGS. 1(a) and 1(b) that the addition of a small amount of high activity ZSM-23 to a predominantly ZSM-48 formulation provides an improvement in activity for decane isomerization while maintaining the high selectivity of a ZSM-48 only version (Example 2).

EXAMPLE 4

0.6% Pt/52/13/35ZSM-23/ZSM-48/Al$_2$O$_3$

A mixture comprising 52 wt % ZSM-23 (having a silica to alumina molar ratio of ~40/1), 13 wt % ZSM-48 (having a silica to alumina molar ratio of ~70/1) and 35 wt % alumina was extruded. The extrudate was calcined in nitrogen for 3 hours at 1000° F. (538° C.), ammonium exchanged with 1N ammonium nitrate solution, and calcined in air for 6 hours at 1000° F. (538° C.). The extrudate was then impregnated via incipient wetness to 0.6 wt % Pt with tetraamminplatinumnitrate followed by calcination in air for 3 hours at 680° F. (405° C.).

EXAMPLE 5

(Comparative). 0.6% Pt/65/35 ZSM-48/Al$_2$O$_3$

A mixture comprising 65 wt % ZSM-48 (having a silica to alumina molar ratio of ~70/1) and 35 wt % alumina was extruded. The extrudate was calcined in nitrogen for 3 hours at 1000° F. (538° C.), ammonium exchanged with 1N ammonium nitrate solution, and calcined in air for 6 hours at 1000° F. (538° C.). The extrudate was then impregnated via incipient wetness to 0.6 wt % Pt with tetraamminplatinumnitrate followed by calcination in air for 3 hours at 680° F. (405° C.).

EXAMPLE 6

Decane Isomerization with Catalysts of Examples 4 and 5

Figure 2A:
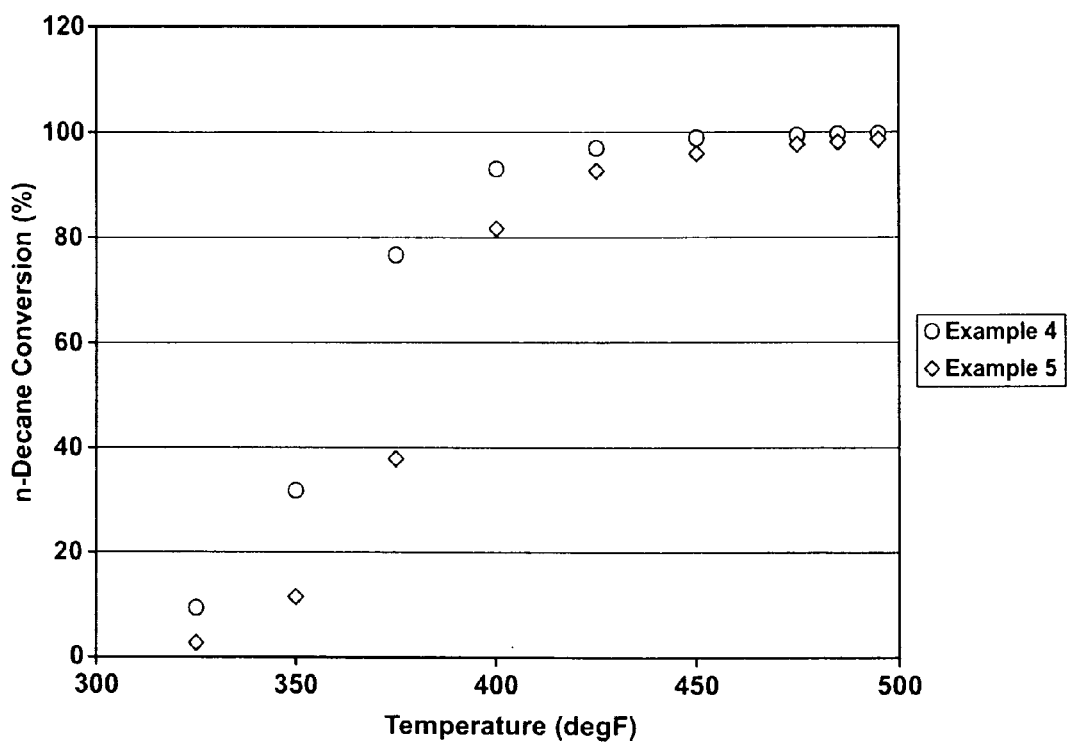
FIG. 2(a) is a graph plotting n-decane conversion against temperature for the catalysts of Examples 4 and 5.
Figure 2B:
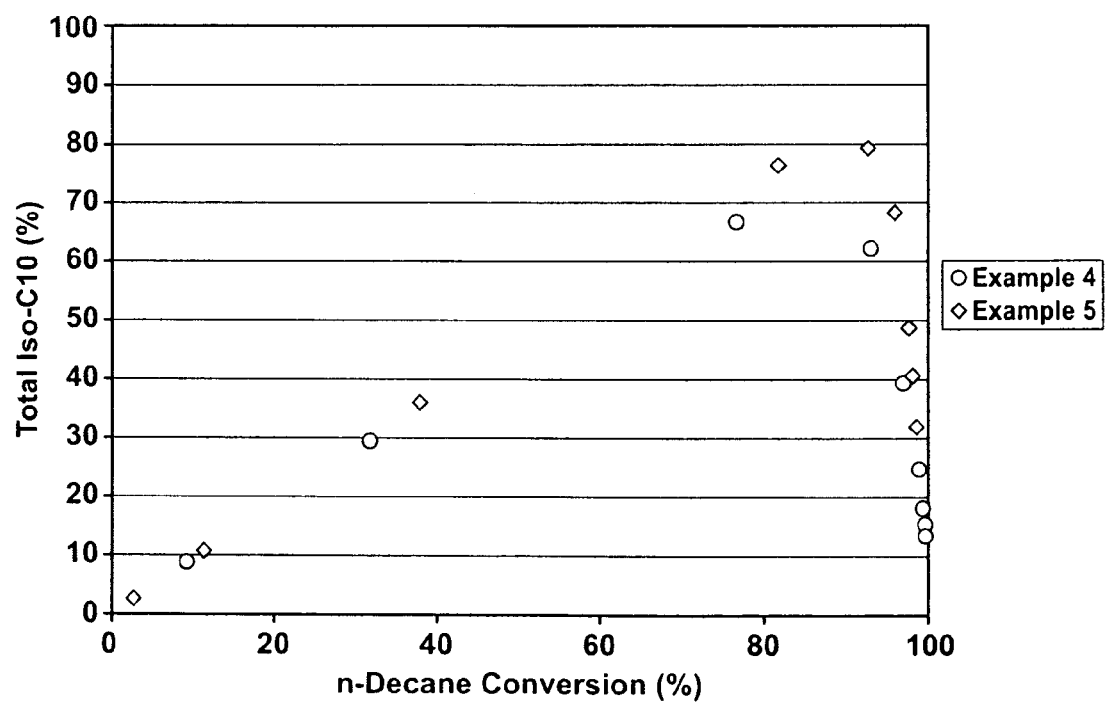
FIG. 2(b) is a graph plotting total iso-$C_{10}$ production against n-decane conversion for the catalysts of Examples 4 and 5.

The test is performed at atmospheric pressure, and the reactor vessel is quartz. Catalysts are crushed and sized to 14/25 mesh, and 1 g of sized catalyst is used for this test. The sample is first heated under nitrogen to 500° F. (260° C.), followed by reduction in hydrogen for 3 hours at atmospheric pressure. The temperature is then reduced to 325° F. (163° C.), and the flow of feed is started. The feed consists of 200 cc/min hydrogen and 0.548 cc/hr liquid n-decane, delivered by a MFC and ISCO pump, respectively. After lining the catalyst out at this temperature, the product from the reactor is analyzed by an on-line GC, and the next setpoint temperature is attained. Each catalyst is evaluated at a total of 9 different temperatures from 325° F. (163° C.) to 495° F. (257° C.). FIGS. 2(a) and 2(b) show the decane isomerization performance of catalysts from Examples 4 and 5. FIG. 2(a) shows the isomerization activity of the materials and FIG. 2(b) shows the isomerization selectivity of the materials.

It will be seen from FIGS. 2(a) and 2(b) that increasing the high activity ZSM-23 content so that it is the major zeolitic component in a formulation with a ~70/1 ZSM-48 results in a dramatic increase in activity compared to the ZSM-48 only version (Example 5). The formulation does show a selectivity debit compared to the ZSM-48 version, illustrating that the activity and selectivity can be tuned based on the amount/ratio of ZSM-23 to ZSM-48.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A process for dewaxing a waxy component-containing hydrocarbon feedstock, the process comprising contacting the feedstock under dewaxing conditions with a catalyst system comprising ZSM-48 and a molecular sieve of the MTT framework type, wherein the ZSM-48 has a silica to alumina molar ratio less than 250.

2. The process of claim 1, wherein the ZSM-48 has a silica to alumina molar ratio less than 150.

3. The process of claim 1, wherein the ZSM-48 has a silica to alumina molar ratio less than 100.

4. The process of claim 1, wherein the MTT framework type molecular sieve has a silica to alumina molar ratio less than 45.

5. The process of claim 1, wherein the MTT framework type molecular sieve has a silica to alumina molar ratio less than 30.

6. The process of claim 1, wherein the MTT framework type molecular sieve has a silica to alumina molar ratio of from 25 to less than 30.

7. The process of claim 1, wherein the catalyst system further comprises a hydrogenation component.

8. The process of claim 7, wherein the hydrogenation component is selected from platinum, palladium, and mixtures thereof.

9. The process of claim 1, wherein the catalyst system comprises particles each containing ZSM-48 and said molecular sieve of the MTT framework type.

10. The process of claim 1, wherein the catalyst system comprises a mixture of particles containing ZSM-48 and particles containing a molecular sieve of the MTT framework type.

11. The process of claim 1, wherein the catalyst system comprises two or more stacked beds, wherein at least one bed includes particles containing ZSM-48 and at least one additional bed includes particles containing a molecular sieve of the MTT framework type.

12. The process of claim 1, wherein the feedstock is a waxy component-containing lube range material.

13. The process of claim 1, wherein the feedstock is a waxy component-containing hydrocarbon oil boiling above about 350° F. (177° C).

14. The process of claim 1, wherein the ratio of ZSM-48 to MTT framework type molecular sieve is at least 25:75.

15. The process of claim 1, wherein the ratio of ZSM-48 to MTT framework type molecular sieve is at least 75:25.

16. A dewaxing catalyst comprising particles each containing ZSM-48 and a molecular sieve of the MTT framework type, wherein the ZSM-48 has a silica to alumina molar ratio less than 250.

17. The catalyst of claim 16, wherein the ZSM-48 has a silica to alumina molar ratio less than 150.

18. The catalyst of claim 16, wherein the ZSM-48 has a silica to alumina molar ratio less than 100.

19. The catalyst of claim 16, wherein the MTT framework type molecular sieve has a silica to alumina molar ratio less than 45.

20. The catalyst of claim 16, wherein the MTT framework type molecular sieve has a silica to alumina molar ratio less than 30.

21. The catalyst of claim 16, wherein the MTT framework molecular sieve has a silica to alumina molar ratio of from 25 to less than 30.

22. The catalyst of claim 16, wherein the particles further comprise a binder.

23. The catalyst of claim 16, wherein the particles further comprise a hydrogenation component.

24. The catalyst of claim 23, wherein the hydrogenation component is selected from platinum, palladium, and mixtures thereof.

25. The catalyst of claim 16, wherein the ratio of ZSM-48 to MTT framework type molecular sieve is at least 25:75.

26. The catalyst of claim 16, wherein the ratio of ZSM-48 to MTT framework type molecular sieve is at least 75:25.

* * * * *